(12) United States Patent
Vincent et al.

(10) Patent No.: US 8,867,809 B2
(45) Date of Patent: Oct. 21, 2014

(54) IMAGE PROCESSING METHOD

(75) Inventors: Graham Richard Vincent, Stockport (GB); Michael Antony Bowes, Whaley Bridge (GB)

(73) Assignee: IMorphics Limited, Manchester (GB)

( * ) Notice: Subject to any disclaimer, the term of this patent is extended or adjusted under 35 U.S.C. 154(b) by 444 days.

(21) Appl. No.: 13/212,630

(22) Filed: Aug. 18, 2011

(65) Prior Publication Data
US 2013/0044928 A1 Feb. 21, 2013

(51) Int. Cl.
*G06K 9/00* (2006.01)
*G06T 7/00* (2006.01)

(52) U.S. Cl.
CPC .............. *G06T 7/0032* (2013.01); *G06T 7/0075* (2013.01); *G06T 2207/10116* (2013.01); *G06T 2207/10072* (2013.01)
USPC .......................................... 382/131; 382/154

(58) Field of Classification Search
CPC ... G06T 7/0022; G06T 7/0024; G06T 7/0051; G06T 7/0075; G06T 2207/10072; G06T 2207/10116; G06K 9/00208; G06K 2209/40; A61B 6/022; A61B 6/032; A61B 6/52; A61B 6/5205; A61B 6/5211; A61B 6/5294
USPC ................. 382/128, 131, 132, 154; 378/4, 25
See application file for complete search history.

(56) References Cited

U.S. PATENT DOCUMENTS

| | | | |
|---|---|---|---|
| 5,315,512 A | 5/1994 | Roth | 364/413.25 |
| 6,320,928 B1 | 11/2001 | Vaillant et al. | 378/4 |
| 7,584,080 B2 | 9/2009 | Taylor et al. | 703/2 |
| 2005/0203420 A1 | 9/2005 | Kleen et al. | 600/476 |
| 2006/0023966 A1 | 2/2006 | Vining | 382/260 |
| 2008/0095423 A1 | 4/2008 | Redel et al. | 382/131 |
| 2011/0194739 A1 | 8/2011 | Vincent et al. | 382/128 |

FOREIGN PATENT DOCUMENTS

WO 2006131646 A1 12/2006 ............ G06T 17/10

OTHER PUBLICATIONS

UKIPO Search Report for Related Application GB1113683.5, Dec. 2, 2011.
PCT/GB2012/051823 Search Report and Written Opinion mailed Oct. 5, 2012.
Ryo Kurazume et al, 3D reconstruction of a femoral shape using a parametric model and two 2D fluoroscopic images, 2007 IEEE International Conference on Robotics and Automation, Apr. 10-14, 2007, Roma Italy, IEEE Piscataway, NJ, USA, pp. 3002-3008.
Tristan Whitmarsh et al, Reconstructing the 3D Shape and Bone Mineral Density Distribution of the Proximal Femur From Dual-Energy X-ray Absorptiometry, IEEE Transactions on Medical Imaging, vol. 30, No. 12, Dec. 2011, IEEE Service Center, Piscataway, NJ, USA, pp. 2101-2114.

(Continued)

*Primary Examiner* — Andrew W Johns
(74) *Attorney, Agent, or Firm* — Bracewell & Giuliani LLP

(57) ABSTRACT

A computer-implemented method of generating a model that models a class of objects. The method comprises, for each of a plurality of objects of the class of objects, receiving a first two-dimensional image of the object and first acquisition data, receiving a second two-dimensional image of the object and second acquisition data and receiving data indicating a plurality of points of interest within the object. The first and second two-dimensional images are combined based upon the first and second acquisition data to generate three-dimensional image data, the three-dimensional image data including data based upon the data indicating a plurality of points of interest and the generated three-dimensional image data for each of the objects of the class of objects is processed to generate the model.

21 Claims, 7 Drawing Sheets

(56) References Cited

OTHER PUBLICATIONS

Hugo Robert et al, 3D Volume reconstruction from small sets of 2D radiographies, Rapport de Magistere L3, Jan. 1, 2007, pp. 1-6, URL: http://mescal.imag.fr/membres/jean-marc.vincent/magistereL3-site/Magistere-L3-Rapports/rapport_robert.pdf (Retrieved on Sep. 26, 2012).

Graham Vincent et al, Fully automatic segmentation of the knee joint using active appearance models, Proceeding of Medical Image Analysis for the Clinic: A Grand Challenge, Sep. 24, 2010, pp. 224-230.

T.F. Cootes, Active Appearance Models, IEEE Transactions on Pattern Analysis and Machine Intelligence, 2001, vol. 23, Issue 6, pp. 681-685.

Tim McInerny and Demtri Terzopoulos, "Deformable Models in Medical Image Analysis: A Survey", Medical Image Analysis, 1(2): 91-108, 1996.

IMAGE PROCESSING METHOD

BACKGROUND OF THE INVENTION

1. Field of the Invention

The present invention relates to methods and apparatus for identifying features in an image. More particularly, but not exclusively, the present invention relates to methods and apparatus for fitting models to an image to identify features in the image.

2. Description of the Related Art

Automated image analysis may be used to reduce manual workloads in determining properties of images. Image analysis is used in a variety of different fields to identify features of images. One area in which image analysis techniques are used is to process medical images where the identification of anatomical features in an image can provide useful information to medical practitioners.

Projection imaging techniques are commonly used to generate medical images in which electromagnetic radiation that can penetrate a solid object, such as X-rays, is generated and projected through an anatomical region of interest. A sensor is arranged to detect the electromagnetic radiation after passing through the anatomical region of interest. The anatomical region of interest attenuates the electromagnetic radiation based upon its density and composition and as such the electromagnetic radiation detected by the sensor is indicative of the composition of the anatomical region of interest. The resulting two-dimensional image represents the cumulative attenuative effect of the density and composition of the anatomical region of interest and can therefore be analysed, either by a human or automatically. However it will be appreciated that analysing two-dimensional images such as X-ray images only provides a limited amount of information.

Imaging techniques such as X-ray Computed Tomography (CT) and Magnetic Resonance (MR) imaging are able to provide three-dimensional information for analysis. MR images are obtained using powerful magnetic fields to align the magnetization of atoms of the anatomical region of interest and are expensive to generate. CT images are generated from a large amount of X-ray data captured at a number of different angles through an anatomical region of interest which is processed using tomographic imaging techniques. CT imaging techniques are also expensive and additionally require exposure of a patient to a large amount of X-ray radiation which is undesirable.

A cost effective three-dimensional imaging technique is therefore desirable.

It is an object of some embodiments of the present invention to obviate or mitigate at least some of the problems set out above.

SUMMARY OF THE INVENTION

According to a first aspect of the invention there is provided a computer-implemented method for generating a three-dimensional representation of an object. The method comprises receiving as input a first two-dimensional projection image and receiving as input acquisition data associated the first two-dimensional projection image. The first two-dimensional projection image is processed based upon the acquisition data to generate a three-dimensional volume of data providing the representation of the object, the volume of data comprising a plurality of voxels, each voxel having a value based upon at least one pixel of the two-dimensional projection image.

In this way, a three-dimensional representation of an object that is useful for processing to identify features of the object can be generated from a two-dimensional image. Although three-dimensional imaging techniques exist, existing techniques are expensive and can require large amounts of radiation to be emitted. By generating a three-dimensional representation of an object as described, these problems are mitigated.

The method may further comprise receiving as input a model modelling a region of interest, and fitting the model to the three-dimensional representation of the object. Features in the three-dimensional representation of the object may be identified based upon the fit of the model. That is, the three-dimensional representation can be processed using modelling techniques to generate useful information. For example, where the object is an anatomical region of interest features of the anatomical region of interest may be identified which may be useful in carrying out a medical procedure.

The fitting may comprise applying a fitting technique selected from the group consisting of: rigid registration, non-rigid registration, active shape modelling and active appearance modelling. Indeed, the fitting may comprise applying any suitable fitting technique.

The method may further comprise receiving as input a second two-dimensional projection image and receiving as input acquisition data associated with the second two-dimensional projection image. The processing may comprise combining the first and second two-dimensional projection images based upon the acquisition data associated with each of the first and second two-dimensional projection images, wherein each voxel has a first value based upon at least one pixel of the first two-dimensional projection image and a second value based upon at least one pixel of the second two-dimensional image.

By combining data in this way, the three-dimensional representation provides more information and can therefore provide a more accurate fitting result. The first and second acquisition data typically indicate different points in the same co-ordinate space and by combining data captured from different points, the three-dimensional representation can provide an indication of the composition of particular points within the volume rather than a net composition along a path through the volume.

The first projection image may be generated by projecting electromagnetic radiation through the object from a first source of electromagnetic radiation to a first sensor of electromagnetic radiation and the second projection image may be generated by projecting electromagnetic radiation through the object from a second source of electromagnetic radiation to a second sensor of electromagnetic radiation. It will be appreciated that the first and second sources of electromagnetic radiation may be the same source. Similarly, the first and second sensors may be the same sensor. In particular, the position of the object may be modified relative to a single source and sensor such that the first and second images provide different projections through the object.

The acquisition data for each two-dimensional projection image may provide an indication of projection paths from a respective source of electromagnetic radiation to a respective sensor of electromagnetic radiation. That is, the acquisition data may indicate the relative positions in three-dimensional space of the source of electromagnetic radiation and the sensor. The three-dimensional space for each of the first and second acquisition data is generally based upon the same coordinate frame. That is, the location of points indicated by the acquisition data for the first image can be determined relative to points indicated by the acquisition data for the second image.

For each voxel of the three-dimensional volume of data, the first value may be based upon a value of at least one pixel of the first image, the or each at least one value being determined based upon a projection path from the first source of electromagnetic radiation to a pixel location of the first sensor and the second value may be based upon a value of at least one pixel of the second image, the or each at least one value being determined based upon a projection path from the second source of electromagnetic radiation to a pixel location of the second sensor. Each voxel that is intersected by a particular projection path may have a value based upon the same pixel value. Each pixel location of the sensor in general provides a single value indicative of the total attenuation of electromagnetic radiation between the source and the sensor. By combining image data for points generated along different paths based upon associated acquisition data, however, data that contains information associated with the different contribution to the total attenuation of different points along a path is generated, and as such, three-dimensional data is provided.

The first value may be based upon a weighted average of a plurality of pixels of the first image and the second value may be based upon a weighted average of a plurality of pixels of the second image. For example, a plurality of projection paths from the source of electromagnetic radiation to a pixel location of the sensor may pass through the voxel, and the first and second values for the voxel may be based upon a combination of the pixel values in the respective image for each pixel location having a projection path that passes through the voxel. Alternatively or additionally the first and second values for the voxels may be based upon a plurality of pixel values for pixel locations adjacent to a pixel location through which a projection path associated with the voxel passes.

The acquisition data may be generated based upon identification of a marker represented in the respective two-dimensional projection image. The acquisition data may be generated based upon a property of the identified marker represented in the respective two-dimensional projection image selected from the group consisting of: a size of the marker, an orientation of the marker, a shape of the marker represented in the projection image and a position of the marker. The marker may be generated by a calibration object arranged to be located in a particular position relative to object that includes, for example, ball-bearings in particular locations within the calibration object, which may be, for example, a brace. The ball-bearings (or other suitable object) strongly attenuate electromagnetic radiation and can therefore easily be identified within the first and second images and used to generate acquisition data using known methods.

The first and second two-dimensional projection images may be radiograph images or fluorograph images. It will be appreciated that more than two two-dimensional projection images may be used to generate the three-dimensional representation of the object. For example, the method may further comprise receiving as input a third two-dimensional projection image and receiving as input third acquisition data associated with said third two-dimensional projection image. The third two-dimensional projection image may be combined with the first and second two-dimensional projection images based upon the third acquisition data associated with the third two-dimensional projection image to generate a three-dimensional volume of data providing the representation of the object, in which each voxel further has a third value based upon at least one pixel of the third two-dimensional projection. Further two-dimensional projection images may be combined in a corresponding manner.

According to a second aspect of the invention there is provided a computer-implemented method of generating a model that models a class of objects. The method comprises, for each of a plurality of objects of the class of objects, receiving as input a first two-dimensional image of the object and first acquisition data associated with the first two-dimensional image and receiving as input data indicating a plurality of points of interest within the object. The two-dimensional image is processed based upon the acquisition data to generate three-dimensional image data, the three-dimensional image data including data based upon the data indicating a plurality of points of interest and the generated three-dimensional image data for each of the objects of the class of objects is processed to generate the model.

The second aspect of the invention therefore generally comprises generating a model that models three-dimensional image data of the form generated by the first aspect of the invention.

The method may further comprise, for each of said plurality of objects of the class of objects receiving as input a second two-dimensional image and second acquisition data associated with the second two-dimensional image, wherein the processing comprises combining the first and second two-dimensional images based upon the acquisition data associated with each of the first and second two-dimensional projection images.

The method may further comprise receiving a three-dimensional image of the object, generating first two-dimensional image of said object based upon said received three-dimensional image and said first acquisition data and generating the second two-dimensional image of the object based upon the received three-dimensional image and the second acquisition data.

Using three-dimensional images to generate two-dimensional images from which further three-dimensional image data can be generated in this way allows data indicating a plurality of points of interest to be provided so that the generated model is able to identify the points of interest in unseen image data. However the model is trained to fit to image data in which points of interest cannot readily be identified, but that can easily and cheaply be obtained. The model is therefore able to accurately fit to such image data to identify features in the image data.

The set of three-dimensional images of the region of interest may be a set of Computed Tomography images or any suitable three-dimensional images in which points of interest can be readily identified and from which two-dimensional images can be generated.

Generating the two-dimensional images of the region of interest may comprise determining a plurality of paths through the object based upon the acquisition data, the plurality of paths representing a path from a source of electromagnetic radiation to an associated sensor of electromagnetic radiation and processing the image to generate, for each of the plurality of paths, a data value providing an indication of total attenuation of the electromagnetic radiation along the path. For example, where the three-dimensional images are Computed Tomography images, the images include data indicative of the composition of the object and this data can be processed using theoretical acquisition data to generate an image that corresponds to an X-ray image generated using a predetermined source and sensor located at corresponding points to a theoretical source and theoretical sensor indicated by the theoretical acquisition data. That is, the three-dimensional images may be processed in accordance with the acquisition data indicating a location of a theoretical source of electromagnetic radiation and a theoretical sensor such that the generated image data corresponds to image data that would be generated by projecting electromagnetic radiation through the object represented by the three-dimensional image data from the location of the theoretical source of electromagnetic radiation to a sensor located at the location of the theoretical sensor.

The three-dimensional image data may comprise a plurality of voxels, each voxel of the three-dimensional data having a first value based upon at least one pixel of the first two-dimensional projection image and a second value based upon at least one pixel of the second two-dimensional image. The first values may be based upon a value of at least one pixel of the first two-dimensional image determined based upon a path from the theoretical source of electromagnetic radiation to at least one pixel location of the theoretical sensor and the second values may be based upon a value of at least one pixel of the second two-dimensional image determined based upon a path from the theoretical source of electromagnetic radiation to at least one pixel location of the theoretical sensor. The first and second values may be determined, for example, based upon an average value for each pixel location of the respective sensor for which a path passes through the volume represented by the voxel.

The second aspect of the invention may use image data generated according to the first aspect of the invention. The first and second aspects of the invention may therefore be combined in any suitable way. For example, a three-dimensional representation of an object generated according to the first aspect of the invention may be processed to fit a model generated according to the second aspect of the invention to the three-dimensional representation of the object and features in the three-dimensional representation of the object may be identified based upon the fit of the model.

Aspects of the invention can be implemented in any convenient form. For example computer programs may be provided to carry out the methods described herein. Such computer programs may be carried on appropriate computer readable media which term includes appropriate tangible storage devices (e.g. discs). Aspects of the invention can also be implemented by way of appropriately programmed computers.

BRIEF DESCRIPTION OF THE DRAWINGS

Embodiments of the present invention will now be described, by way of example only, with reference to the accompanying drawings, in which.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

Figure 1:
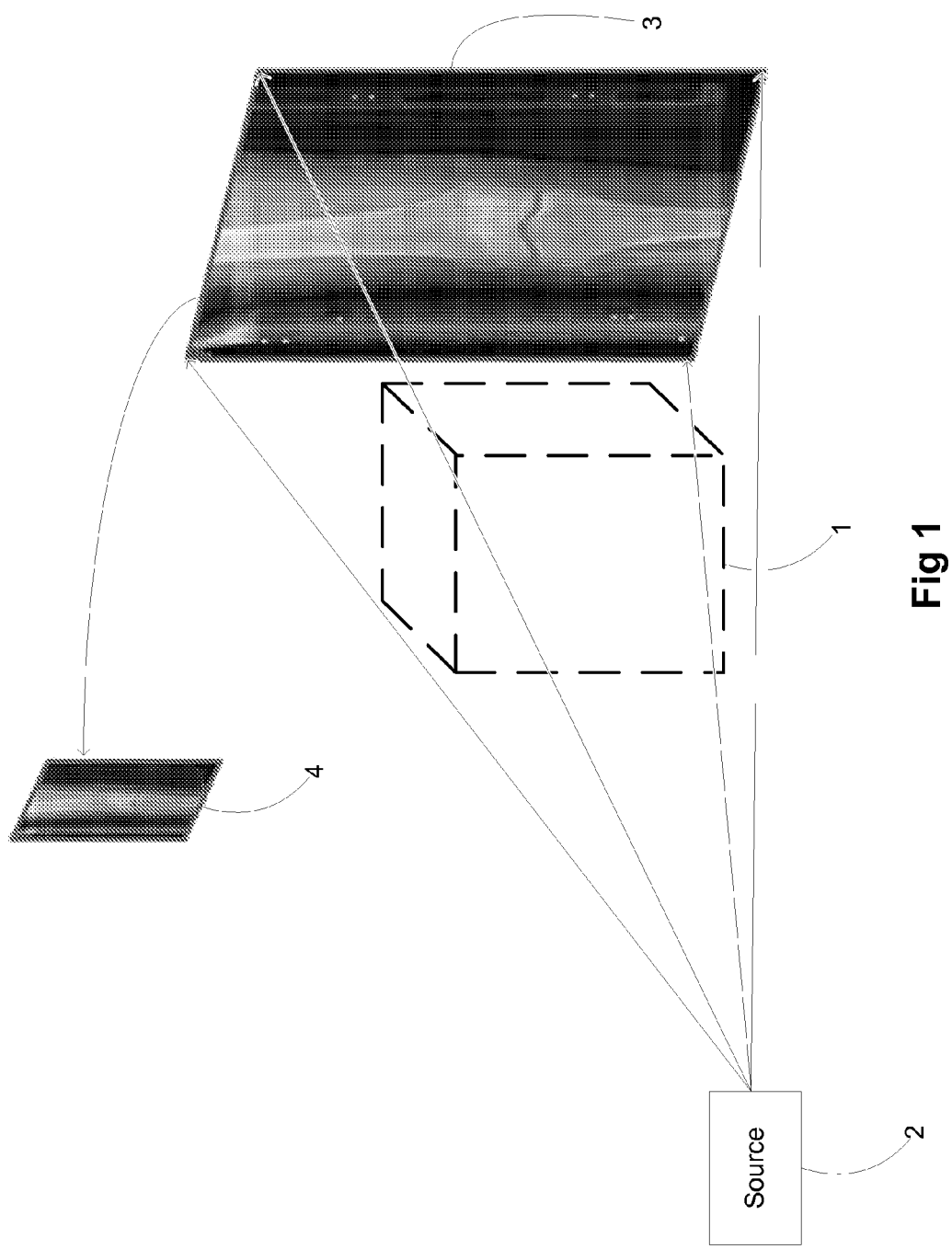
FIG. 1 is a schematic illustration of a known projection imaging arrangement.

Referring to FIG. 1, a projection imaging arrangement for imaging an anatomical region of interest 1 for which it is desirable to generate an image showing features of the anatomical region of interest 1 is shown. The anatomical region of interest 1 may be, for example, a knee joint of a patient who requires surgery, and it may be desirable to determine features of the knee joint prior to performing surgery. Using known projection imaging techniques, a source of electromagnetic radiation 2 is arranged to project electromagnetic radiation such as X-rays through the anatomical region of interest 1 to a sensor 3. Each point along a path of the electromagnetic radiation from the source 2 to the sensor 3, the path passing through the anatomical region of interest 1, absorbs a portion of the electromagnetic radiation projected through it based upon the density and composition of the point. The radiation that is detected by the sensor 3 can be used to generate an image 4 presenting the density and composition of the anatomical region of interest 1 along the path of the electromagnetic radiation from the source to the sensor.

Figure 2:
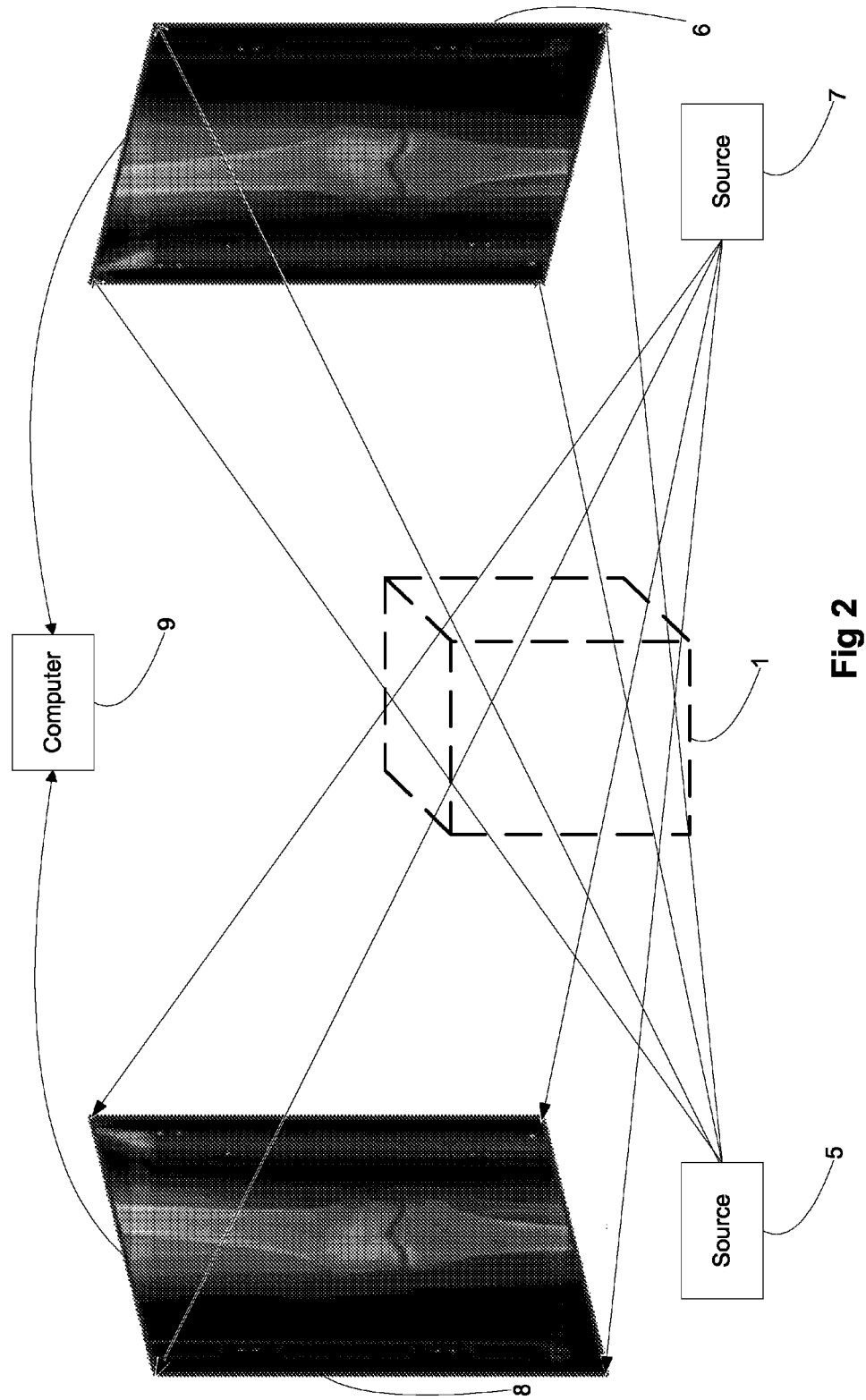
FIG. 2 is a schematic illustration of a projection imaging arrangement suitable for carrying out the invention.

FIG. 2 shows a projection imaging system suitable for imaging the same anatomical region of interest 1 according to an embodiment of the invention. The projection imaging system of FIG. 2 has a first source of electromagnetic radiation arranged to project electromagnetic radiation through the anatomical region of interest 1 to a first sensor 6 and a second source of electromagnetic radiation 7 arranged to project electromagnetic radiation through the anatomical region of interest 1 to a sensor 8. The first and second sources of electromagnetic radiation 5, 7 and first and second sensors 6, 8 are arranged such that electromagnetic radiation is projected through the anatomical region of interest 1 from two different orientations such that the radiation detected by the first and second sensors 6, 8 passes through the anatomical region of interest 1 along different paths. Data from each of the sensors 6, 8 is provided to a computer 9 and processed as described below.

Figure 2A:
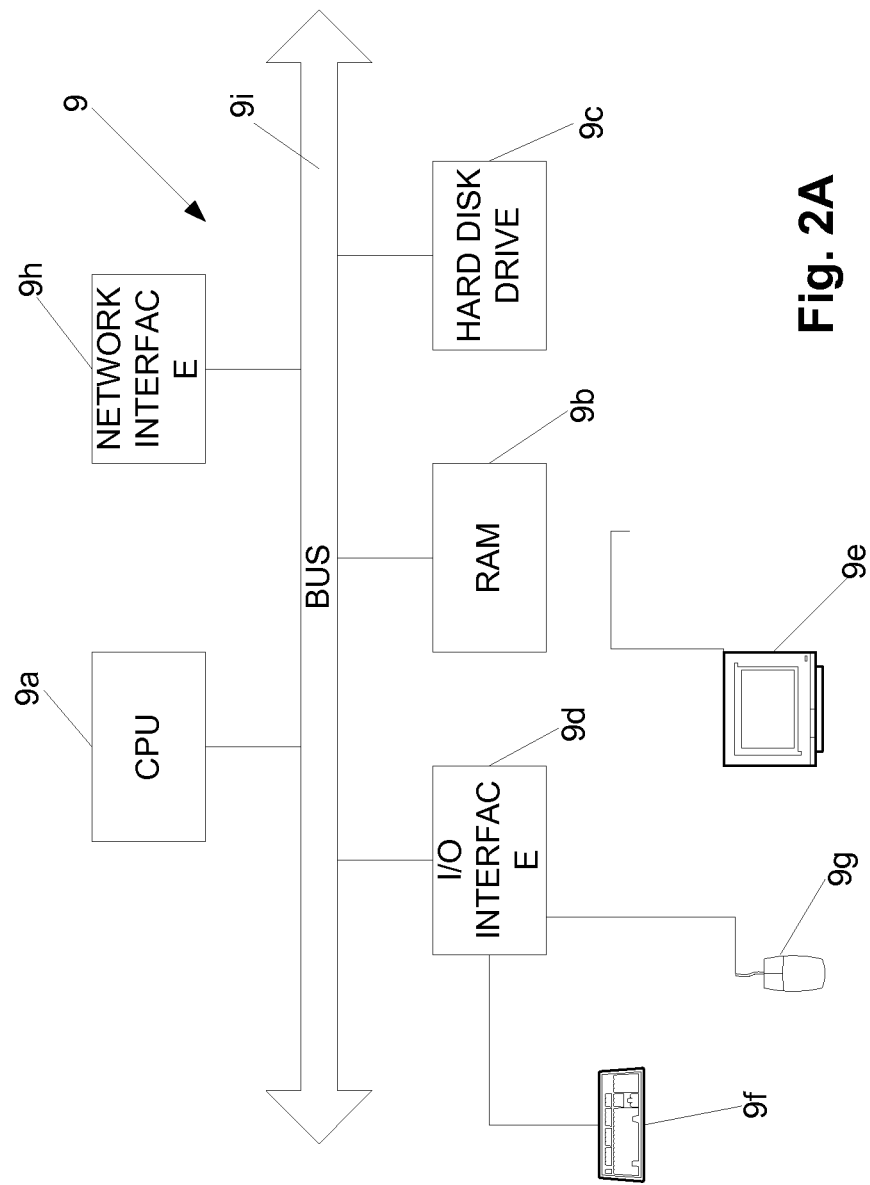
FIG. 2A is a schematic illustration showing a computer of the imaging arrangement of FIG. 2.

FIG. 2A shows the computer 9 in further detail. It can be seen that the computer comprises a CPU 9a which is configured to read and execute instructions stored in a volatile memory 9b which takes the form of a random access memory. The volatile memory 9b stores instructions for execution by the CPU 9a and data used by those instructions. For example, in use, the data generated by the sensors 6, 8 of FIG. 2 may be stored in the volatile memory 9b.

The computer 9 further comprises non-volatile storage in the form of a hard disc drive 9c. The data generated by the sensors 6, 8 may be stored on the hard disc drive 9c. The computer 9 further comprises an I/O interface 9d to which is connected peripheral devices used in connection with the computer 9. More particularly, a display 9e is configured so as to display output from the computer 9. The display 9e may, for example, display a representation of the data generated by the sensors 6, 8. Input devices are also connected to the I/O interface 9d. Such input devices include a keyboard 9f and a mouse 9g which allow user interaction with the computer 9. A network interface 9h allows the computer 9 to be connected to an appropriate computer network so as to receive and transmit data from and to other computing devices. The CPU 9a, volatile memory 9b, hard disc drive 9c, I/O interface 9d, and network interface 9h, are connected together by a bus 9i.

Figure 3:
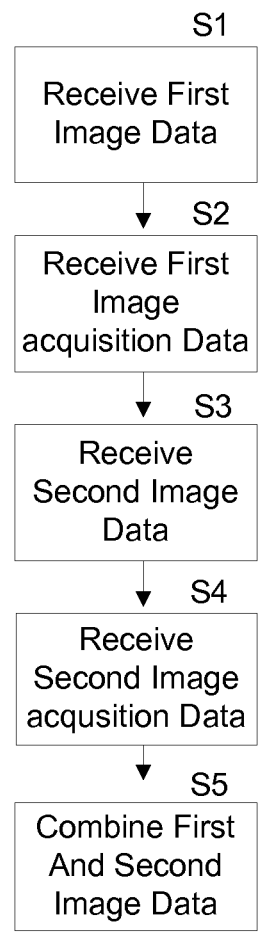
FIG. 3 is a flowchart showing processing used to generate image data in an embodiment of the invention.

FIG. 3 shows processing to generate image data according to an embodiment of the invention. At step S1 first image data is received and at step S2 first acquisition data is received. The first image data is data generated by the first sensor 6 of FIG. 2 and the first acquisition data indicates the relative positions in three-dimensional space of the source of electromagnetic radiation 5 associated with the sensor 6 and the sensor 6. As such, the first acquisition data received at step S2 can be used to determine the projection path of the electromagnetic radiation from the source of electromagnetic radiation 5 through the anatomical region of interest 1 to the sensor 6 for each sensing location of the sensor 6. At step S3 second image data is received and at step S4 second acquisition data is received. The second image data and second acquisition data generally correspond to the first image data and first image acquisition data respectively but is data associated with the second source of electromagnetic radiation 6 and sensor 8.

The acquisition data may be generated based upon a feature which can be identified in the first and second image. For example, the imaged region may include one or more markers which can be identified in the first and second images and which provide an indication of the location and orientation of the source and sensor that was used to generate the particular image data. The markers may take any convenient form such as a calibration object arranged to be located in a particular position relative to the anatomical region of interest that includes ball-bearings in particular locations within the calibration object. The ball-bearings strongly attenuate electromagnetic radiation and can therefore easily be identified within the first and second images.

At step S5 the first and second image data received at steps S1 and S3 are combined based upon the first and second acquisition data received at steps S2 and S4 to generate data values for each voxel of a volume which represents the anatomical region of interest. As described in detail below, the first and second image data are combined such that each voxel is associated with a pair of values, one of the pair of values being based upon the first image data and the other of the pair of values being based upon the second image data.

As indicated above, the image data received at steps Si and S3 is data generated from projection imaging techniques and as such each pixel value of the first and second image data represents the total attenuation of the electromagnetic radiation on a projection path originating from the source of electromagnetic radiation 5, 7 and terminating at the sensor location that determines the pixel value. As such, each pixel value contains attenuation information based upon the attenuation provided by each point along the path. Although some points along the path attenuate the electromagnetic radiation more than other points along the path, only a single value is provided by each image for each path. For example, a point that lies in a bone of a knee joint of a patient will attenuate the signal a large amount, whereas a point that lies in space containing only air will attenuate the signal a negligible amount, but it is not possible to determine the different attenuation of points along the path based upon a particular pixel value. By combining image data for points generated along different paths based upon associated acquisition data, however, data that contains information associated with the different contribution to the total attenuation of different points along a path is generated, and as such, three-dimensional data is provided.

Figure 4:
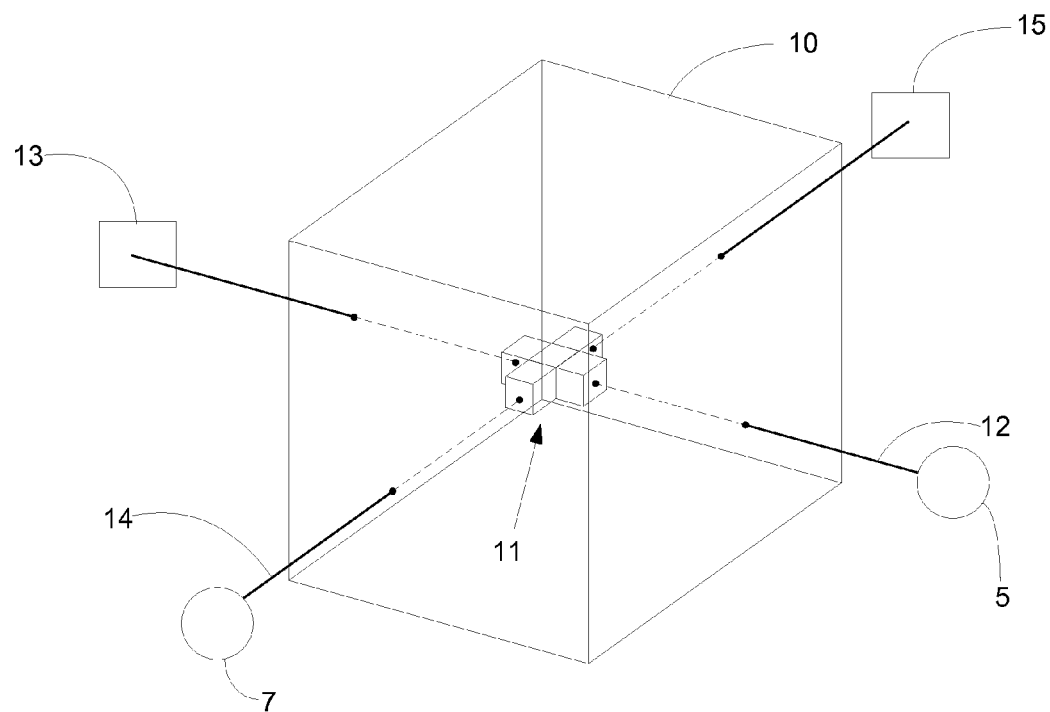
FIGS. 4 and 5 illustrate combination of image values to generate image data.
Figure 5:
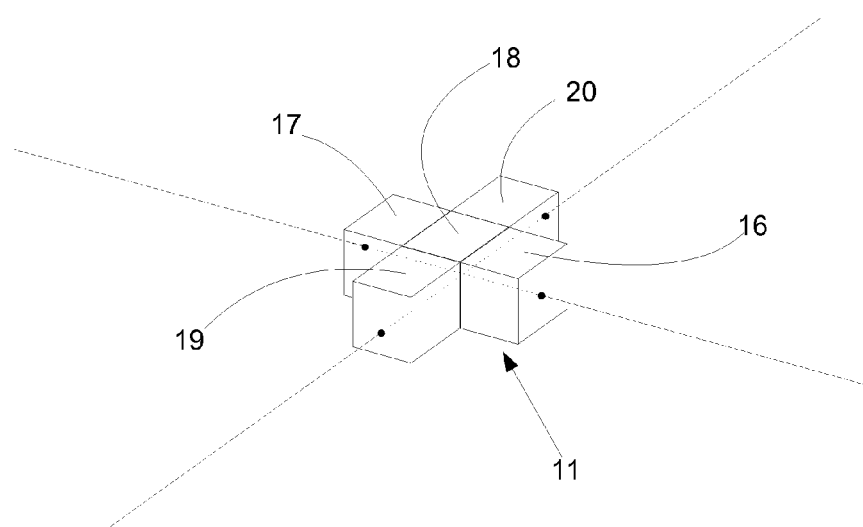

Combination of first and second image data is illustrated in FIGS. 4 and 5. FIG. 4 shows a volume 10 that represents the anatomical region of interest. The volume 10 comprises a plurality of voxels 11, a small number of which are shown in FIG. 4 and in further detail in FIG. 5. Each voxel 11 is associated with a pair of data values, one of the data values being based upon a pixel value of the first image data and the other of the data values being based upon a pixel value of the second image data. The particular pixel value of the respective image data for each voxel is determined based upon the path from the source of electromagnetic radiation 5, 7 to the sensor 6, 8. A first path 12 originating from source 5 to sensor location 13 and a second path 14 originating from source 7 to sensor location 15 are shown in FIG. 4 and each path 12, 14 generates a respective single value at sensor locations 13, 15 that provide values to some of the voxels 11.

Each voxel 16, 17, 18 lying on path 12 takes as first value the value of sensor location 13 and each voxel 18, 19, 20 lying on the path 14 takes as second value the value of sensor location 15. Each of voxels 16, 17 take as second value a value based upon a sensor location different to sensor location 13 and each of voxels 19, 20 take as first value a value based upon a sensor location different to sensor location 15. In this way, each voxel takes a pair of values which in combination provide an indication of the attenuation of a corresponding part of the anatomical region of interest, but that is based upon total attenuation along two intersecting paths.

In some embodiments, some or all voxels may lie on a plurality of paths. That is, a plurality of paths originating from a source to a plurality of sensor locations may pass through some or all voxels. Where a voxel lies on a plurality of paths from a source to sensor locations the voxel may take a value based upon a combination of values of those sensor locations. For example, the values of the sensor locations on the path may be combined using a weighted average. Alternatively, a voxel may lie on a single path to a sensor location and values of the sensor location and sensor locations adjacent to that sensor location may be averaged to provide a value for the voxel.

Figure 6:
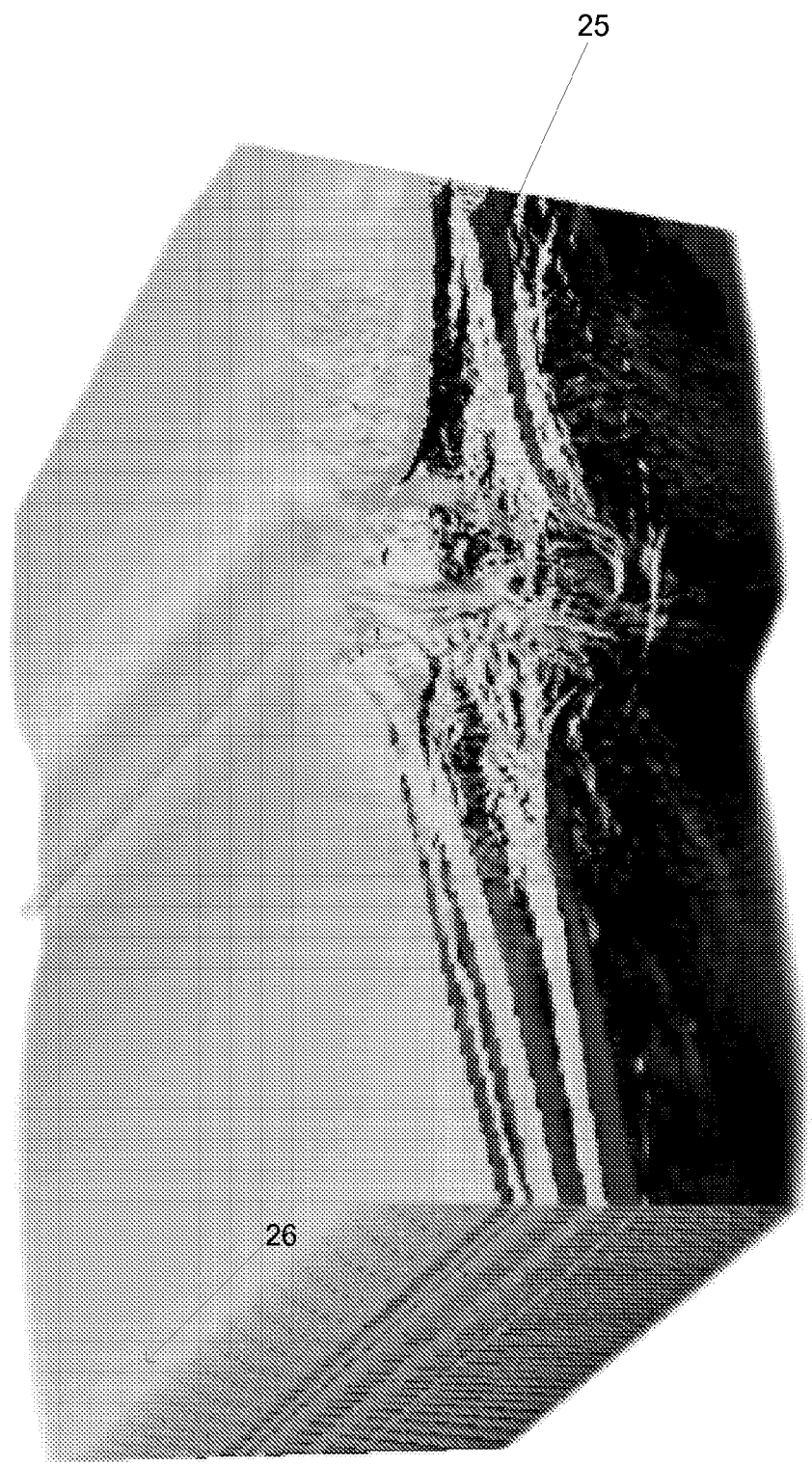
FIG. 6 illustrates propagation of image values through a volume.

FIG. 6 illustrates how pixel values from a sensor such as sensors 6, 8 are propagated through a volume to provide values for voxels. FIG. 6 shows a three-dimensional volume having a side 25 which has values corresponding to a two-dimensional image generated based upon a sensor. The two-dimensional image is generated by passing electromagnetic radiation through an anatomical region of interest generally in direction 26, and as such values of the side 25 are propagated in direction 26 to form a volume in which each slice through the volume in the plane of side 25 has identical values. The image data generated at step S5 is generated by combining data values of two such volumes, with the combination being determined based upon acquisition data that allows corresponding points to be determined such that each voxel has values indicative of the attenuation of a corresponding point in more than one direction.

Figure 7:
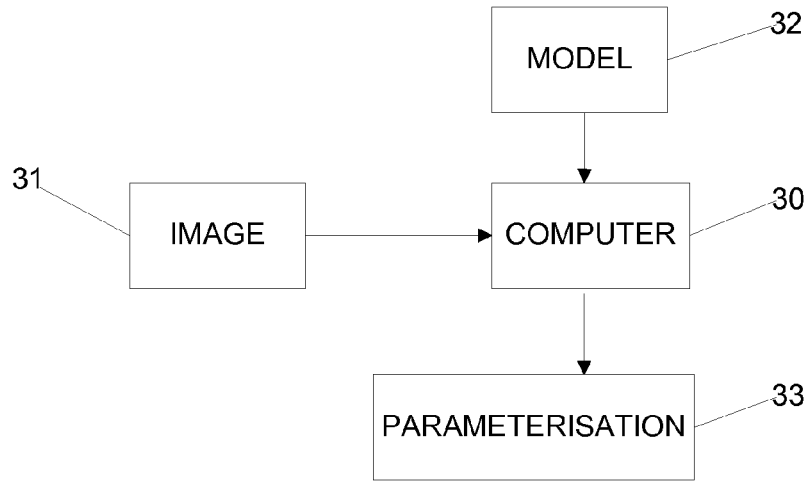
FIG. 7 is a schematic illustration of a system for analysis of images according to an embodiment of the present invention.

The image data generated at step S5 of FIG. 3 is processed to identify features of the anatomical region of interest. Referring to FIG. 7, a computer 30, which may be the same computer as computer 9 described above or a computer of the same form as the computer 9, is arranged to receive image data 31 generated in the manner described above of an anatomical region of interest and to receive a model 32. The model 32 is fitted to the image data 31 to generate a parameterisation of the model 33. The model 32 is a statistical model such as an active appearance model or active shape model, which has been created based upon a training set of images of anatomical regions of interest of the same type as the anatomical region of interest that is the subject of image data 31, and that are generated in a corresponding manner to the image data 31, as described below. The model 32 is a statistical model of the variation within the training images and is generated by processing the training set of images to generate a mean model and a range of variation from the mean model of the training set. The parameterisation 33 generated by computer 30 indicates features of the anatomical region of interest represented by the image 31 and can therefore be used to identify features of the represented anatomical region of interest.

The processing described below makes reference to a model M, built based upon a training set of image data. The model M is a statistical model built based upon a training set of image data and is a model of features of interest in image data, as set out above. It will be appreciated that the generation and fitting of the model M can be carried out in any convenient way. For example, the model M can be generated using a parameterisation technique described in U.S. Pat. No. 7,584,080, the contents of which are herein incorporated by reference.

In order that the model M identifies points of interest, those points of interest are indicated in the training set of images. The set of points of interest are selected based upon features of the object to be modelled. For example, if the object to be modelled is a knee joint, points of interest may be selected based upon anatomical features of the knee joint.

In order for the model to be able to accurately fit to image data as described above, it is desirable that the training set of image data corresponds to the image data to which the model is to be fitted as closely as possible. As such, the model may be trained on three-dimensional image data generated from radiograph images and acquisition data as described above, together with a set of points of interest within the three-dimensional image data. However, manually marking a training set of image data of the form described above is problematic because, whilst the image data represents three-dimensional image data, the image data is not easily interpretable by a human to indicate the points of interest. The points of interest may therefore, for example, be indicated in a CT image of the same anatomical region of interest as the subject of the radiograph images from which the three-dimensional image data is generated, and the points of interest may be located in the three-dimensional image data using registration methods. For example the points of interest may be located in the three-dimensional image data by manually adjusting the three-dimensional image data until a two-dimensional projection of the three-dimensional image data onto a two-dimensional projection of the CT image correspond.

Alternatively, training image data that is of a corresponding form to the image data to which the model M is to be fitted and that is suitable for generation of the model M having predetermined points of interest marked can be generated in the manner that will now be described.

Figure 8:
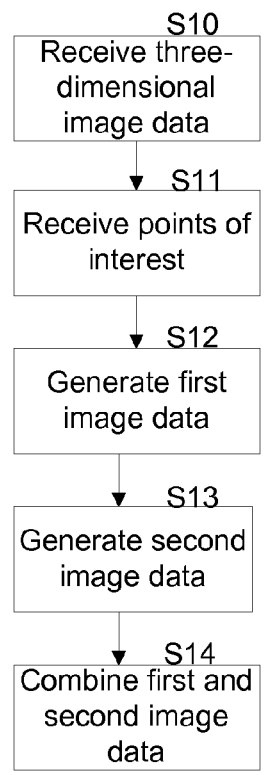
FIG. 8 is a flowchart showing processing carried out to analyse an image in the system of FIG. 7.

Referring to FIG. 8, processing to generate a training image is shown. At step S10 three-dimensional image data is received. The three-dimensional image data may be, for example, X-Ray Computed Tomography (CT) image data that provides a three-dimensional representation of an anatomical region of interest in which a human expert can identify anatomical features. At step S11 data indicating points of interest in the three-dimensional image data is received. The points of interest are provided by a human expert manually marking the three-dimensional image data and are selected based upon features of the object to be modelled, as indicated above. At step S12 first image data is generated from the image received at step S10 and at step S13 second image data is generated. Generation of the first and second image data is described in further detail below.

Each of the first and second image data are generated by processing the three-dimensional image data received at step S10 to generate a two-dimensional representation of the three-dimensional image data based upon acquisition data and each two-dimensional representation is generated such that it has the same form as a projection image generated as described above with reference to FIG. 2.

That is, the three-dimensional image data received at step S10 provides an indication of the density and attenuation of each point in the volume represented by the three-dimensional image data. Acquisition data indicating theoretical relative positions in three-dimensional space of a theoretical source of electromagnetic radiation and a theoretical sensor arranged to detect the electromagnetic radiation can be processed to generate theoretical paths through the volume represented by the three-dimensional image data. Since the attenuation of each point in the volume represented by the three-dimensional image data is known, the total attenuation along each theoretical path can be determined and an image that corresponds to a two-dimensional image generated by projecting electromagnetic radiation through the anatomical region of interest represented in the three-dimensional image data from the theoretical source to the theoretical sensor can be generated.

At step S14 the first and second image data generated at steps S12 and S13 are processed based upon the corresponding acquisition data used to generate the images in the manner described above with reference to FIG. 3 to generate further three-dimensional image data. The further three-dimensional image data is generated in the same three-dimensional co-ordinate frame as the three-dimensional image data received at step S10 and the location of the points of interest received at step S11 therefore indicate the location of the points of interest in the generated three-dimensional image data.

Since the further three-dimensional image data contains data indicating the points of interest in the three-dimensional image data received at step S10 it is therefore suitable for training a model to fit to image data as described above. Furthermore, since the further three-dimensional image data is generated in such a way that it corresponds to image data generated as described above from previously unseen image data, a model trained on the further three-dimensional image data is able to accurately fit to image data generated as described above with reference to FIG. 3.

It is described above that two images are combined at step S5 of FIG. 3 based upon respective acquisition data to generate data values for each voxel of a volume which represents an anatomical region of interest. However it will be appreciated that data vales for each voxel of a volume which represents an anatomical region of interest can be generated from a single image based upon acquisition data. In particular, each voxel in the volume that lies on a path as indicated by the acquisition data may take a value based upon a pixel of the image in the manner described above with reference to FIG. 6. In this way a three-dimensional representation of the anatomical region of interest may be generated from a single two-dimensional image and that three-dimensional representation may be processed using the system of FIG. 7 to generate a parameterisation indicating features of the anatomical region of interest represented by the single image.

Where the three-dimensional representation of an anatomical region of interest is generated from a single two-dimensional image by the system of FIG. 7, the model 32 of FIG. 7 is a model trained on three-dimensional representations generated in the same way, and includes an indication of features of the anatomical region of interest in three-dimensions rather than the features visible in the two-dimensional projection. As such, it is still possible to identify features that cannot be visually identified in the two-dimensional image using model fitting.

The model may be, for example, a shape model or an appearance model, which are both described below. It will be appreciated, however, that other models may be used such as for example, deformable templates or deformable atlases which take the form of a typical or average example which is allowed to deform within a set of constraints. A review of deformable models is given in Tim McInerney and Demetri Terzopoulos "Deformable Models in Medical Image Analysis: A Survey", Medical Image Analysis, 1(2):91-108, 1996 the contents of which is herein incorporated by reference.

The following description is based upon two-dimensional image data in which each pixel location takes a single value and in which shape and appearance is modelled, however it will be appreciated that the principles can be applied to three-dimensional image data in which each voxel location takes a tuple of values. Although the image data used to train the model in the present invention is generally not of a form that a human expert can readily interpret, models of the type described below act upon sets of numbers representing images in which points of interest are already identified and as such the form of the data being difficult to interpret by a human is not problematic.

In the case where the model is a shape model, the set of points of interest associated with each training image, generated in the manner described above, is represented by a shape vector comprising a concatenation of the coordinates of the selected points. For two-dimensional image data in which each pixel has a single value, the shape vector x for particular training image data takes the form:

$$x = (x_1, y_1, x_2, y_2, \ldots, x_n, y_n) \quad (1)$$

where n is the number of points of interest in the image.

A mean shape vector $\bar{x}$ can be calculated according to equation (2):

$$\bar{x} = \frac{1}{N} \sum_{i=1}^{N} x_i \quad (2)$$

where N is the number of training images; and
$X_i$ is a vector representing a training image i.

A plurality of shape vectors, one for each training image can be used to generate a matrix X, in which each row represents a shape vector.

Each of the shapes represented by the points selected in a respective training image is translated, rotated and scaled so that their centroids coincide and the sum of squared differences between the points in each image and those on the mean shape is minimised.

A covariance matrix S can be created from the aligned shapes by first calculating the mean shape vector using equation (2). For each image in the training set, the deviation from the mean shape can be calculated from equation (3):

$$dx_i = x_i - \bar{x} \quad (3)$$

The covariance matrix S is then calculated using equation (4):

$$S = \frac{1}{N} \sum_{i=1}^{N} dx_i dx_i^T \quad (4)$$

The eigenvectors of the matrix S can be determined and a matrix P of the t most significant eigenvectors can be created. In this way, any shape can be represented according to the shape model given by equation (5):

$$x = \bar{x} + P_s b_s \quad (5)$$

where x is a vector representing the shape;
$\bar{x}$ is a mean shape vector generated from shape vectors of images in the training set (according to equation (2));
$P_s$ is the matrix of eigenvectors described above; and
$b_s$ is a t-element vector of weights to be applied to eigenvectors of the matrix $P_s$ to generate the vector x for the shape.

The components of $b_s$ ($b_i$, i=1...t) are referred to as shape parameters. The eigenvectors $P_i$ are sorted according to their eigenvalues $\lambda_i$, which describe the observed variance over the training shapes associated with each eigenvector. That is to say the $\lambda_i$ represent the proportions of variance from the mean shape that are described by each of the eigenvectors. By selecting a value of t ($\leq$N), the model can be made to represent some chosen proportion of the total variance observed in the training shapes.

Each eigenvector included in the matrix $P_s$ represents a mode of variation of the modelled shape. Varying values of elements of the vector $b_s$ allows generation of shapes within the range observed within images of the training images. That is, variation of one element b1 of the vector $b_s$ will affect one characteristic of the modelled shape, while variation of a second element b2 will affect a different characteristic of the modelled, shape.

An appearance model is an extension of the shape model described above. To build a statistical model of the grey-level appearance after the points selected in a respective training image are translated, rotated and scaled so that their centroids coincide and the sum of squared differences between the points in each image and those on the mean shape is minimised, as described above, grey-level information $g_{im}$ is sampled from the image over the region covered by the mean shape $\bar{x}$, after normalising the image to minimise the effect of global lighting variation. Applying the method set out above to determine the shape model (5) to the grey-level data, a grey-level model is obtained, as shown in equation (6):

$$g = \bar{g} + P_g b_g \quad (6)$$

where:
$\bar{g}$ is the mean normalised grey-level vector;
$P_g$ is a matrix of eigenvectors; and
$b_g$ is a set of grey-level parameters.

Varying values of elements of the vectors $b_s$ (in equation (5)) and $b_g$ (in equation (6)) allows generation of shapes and grey-level images within the range observed within images of the training images.

In order that the relationship between shape and grey-level variation in the training images is captured, a vector b is generated for each training image according to equation (7):

$$b = \begin{pmatrix} W_s b_s \\ b_g \end{pmatrix} = \begin{pmatrix} W_s P_s^T (x - \bar{x}) \\ P_g^T (g - \bar{g}) \end{pmatrix} \quad (7)$$

where:
$W_s$ is a diagonal matrix of weights associated with each shape parameter in the vector $b_s$.

The matrix $W_s$ adjusts values of $b_s$ to allow for the difference in units between the shape and grey level models.

A further model shown in equation (8) is generated from the set of concatenated vectors b, using the method described above to generate models (5) and (6).

$$b = Qc \quad (8)$$

where:
Q is a matrix of eigenvectors; and
c is a vector of appearance parameters.

Since the model of equation (8) is linear, shape and grey-levels may be expressed directly as functions of c according to equation (9).

$$x = \bar{x} + P_s W_s Q_s c, \; g = \bar{g} + P_g Q_g c \quad (9)$$

where the matrix of eigenvectors $$Q = \begin{pmatrix} Q_s \\ Q_g \end{pmatrix}.$$

An example image can be synthesised for a given c by generating the shape-free grey-level image from the vector g and warping it using the control points described by x.

In the case where the data is of the form described above, variation of data of the form (10) is modelled rather than grey-level variation.

$$I = (([x_{11}, y_{11}], [x_{12}, y_{12}]), ([x_{21}, y_{21}], [x_{22}, y_{22}]), \ldots, \\ ([x_{n1}, y_{n1}], [x_{n2}, y_{n2}])) \quad (10)$$

where:
$[x_{n1}, y_{n1}]$ is a pixel value in the first image data determined to be associated with voxel n having coordinates in three-dimensional space (a, b, c) based upon the acquisition data;
$[x_{n2}, y_{n2}]$ is a pixel value in the second image data determined to be associated with voxel n based upon the acquisition data; and
$([x_{n1}, y_{n1}], [x_{n2}, y_{n2}])$ is a tuple of pixel values for voxel n.

In general terms, the aim of model fitting is to determine the set of parameters c which best fit the model to an unseen image. One way to do this is by using active appearance models which are described below.

An active appearance model uses the difference between a reconstructed image generated by the model and the underlying target image I, to iteratively drive the model parameters towards better values. In a prior learning stage, known displacements to the vector of appearance parameters, δc, are applied to known model instances and the resulting difference between model and image, $\delta I = I_i - I_m$, is measured, where $I_i$ is a vector of grey-level values in the image I and $I_m$ is a vector of grey-level values for the current model parameters c. Multivariate linear regression is applied to a large set of such training displacements and an approximate linear relationship, $\delta c = A \delta I$, is established.

To identify the best match between the model and image I the magnitude of the difference vector $\Delta = |\delta I|^2$ is minimised using the linear relationship learnt during the learning stage to predict an adjustment to the model parameters c which improves model fit. The model parameters c are repeatedly adjusted until no improvement is made to Δ. Active appearance models are described in detail in T. F. Cootes, C. J. Edwars, C. J. Taylor "Active Appearance Models", IEEE Transactions on Pattern Analysis and Machine Intelligence, 2001, Volume 23, Issue 6, which is herein incorporated by reference.

The model may be fitted to an unseen image in any convenient way, for example by fitting a plurality of models to the image which together model a region of interest of the image, as described in applicants' co-pending U.S. patent application Ser. No. 12/703438, which is herein incorporated by reference.

It will be appreciated that whilst the above description indicates that first and second image data are combined to generate image data, more than two image data can be combined to provide a volume in which voxels have data values based upon each of the combined image data. Furthermore, whilst it is indicated above that two sources of electromagnetic radiation and two sensors are used, it will be appreciated that a single source of electromagnetic radiation and sensor may be used to provide different images as described. For example the source and sensor may be moved relative to the anatomical region of interest or alternatively the anatomical region of interest may be moved relative to the source and sensor to generate different image as described.

The sensor may take any convenient form such as a film or an electronic sensor.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

That claimed is:

1. A computer-implemented method for generating a three-dimensional representation of an object, the method comprising:
receiving as input a first two-dimensional projection image;
receiving as input acquisition data associated with said first two-dimensional projection image;
processing said first two-dimensional projection image based upon said acquisition data to generate a three-dimensional volume of data providing said representation of said object, the volume of data comprising a plurality of voxels, each voxel having a value based upon at least one pixel of the two-dimensional projection image.

2. A computer-implemented method according to claim 1, further comprising:
receiving as input a model modelling a region of interest;
fitting said model to said three-dimensional representation of said object; and
identifying features in the three-dimensional representation of said object based upon said fit of said model.

3. A computer-implemented method according to claim 2, wherein said fitting comprises applying a fitting technique selected from the group consisting of: rigid registration, non-rigid registration, active shape modelling and active appearance modelling.

4. A computer-implemented method according to claim 1, further comprising:

receiving as input a second two-dimensional projection image; and
receiving as input acquisition data associated with said second two-dimensional projection image;
wherein said processing comprises combining said first and second two-dimensional projection images based upon said acquisition data associated with each of said first and second two-dimensional projection images, wherein each voxel has a first value based upon at least one pixel of the first two-dimensional projection image and a second value based upon at least one pixel of the second two-dimensional image.

5. A computer-implemented method according to claim 4, wherein said first projection image is generated by projecting electromagnetic radiation through said object from a first source of electromagnetic radiation to a first sensor of electromagnetic radiation and said second projection image is generated by projecting electromagnetic radiation through said object from a second source of electromagnetic radiation to a second sensor of electromagnetic radiation.

6. A computer-implemented method according to claim 5, wherein said acquisition data for each two-dimensional projection image provides an indication of projection paths from a respective source of electromagnetic radiation to a respective sensor of electromagnetic radiation.

7. A computer-implemented method according to claim 6, wherein, for each voxel of said three-dimensional volume of data, said first value is based upon a value of at least one pixel of said first image, the or each at least one value being determined based upon a projection path from said first source of electromagnetic radiation to a pixel location of the first sensor and said second value is based upon at least one value of a pixel of said second image, the or each at least one value being determined based upon a projection path from said second source of electromagnetic radiation to a pixel location of the second sensor.

8. A computer-implemented method according to claim 7, wherein said first value is based upon a weighted average of a plurality of pixels of said first image and said second value is based upon a weighted average of a plurality of pixels of said second image.

9. A computer-implemented method according to claim 4, further comprising:
receiving as input one or more further two-dimensional projection images; and
receiving as input respective acquisition data associated with each of said one or more two-dimensional projection images;
wherein each of said one or more further two-dimensional projection images is combined with said first and second two-dimensional projection image based upon said respective acquisition data associated with each of said one or more two-dimensional projection images to generate a three-dimensional volume of data providing said representation of said object, each voxel further having a respective further value based upon at least one pixel of each of said one or more further two-dimensional projection images.

10. A computer-implemented method according to claim 1, wherein said acquisition data is generated based upon identification of a marker represented in the respective two-dimensional projection image.

11. A computer-implemented method according to claim 10, wherein said acquisition data is generated based upon a property of the identified marker represented in the respective two-dimensional projection image selected from the group consisting of: a size of the marker, an orientation of the marker and a position of the marker.

12. A computer-implemented method according to claim 1, wherein the first two-dimensional projection image is a radiograph image or a fluorograph image.

13. A computer-implemented method according to claim 1, further comprising:
for each of a plurality of objects of a class of objects:
receiving as input, data indicating a plurality of points of interest within said object;
receiving as input said first two-dimensional projection image;
receiving as input said acquisition data associated with said first two-dimensional projection image;
receiving as input a second two-dimensional projection image;
receiving as input acquisition data associated with said second two-dimensional projection image;
processing said two-dimensional projection image based upon said acquisition data associated therewith to generate three-dimensional image data, said three-dimensional image data including data based upon said data indicating a plurality of points of interest; and
processing said generated three-dimensional image data for each of said objects of said class of objects to generate a model that models the class of objects.

14. A computer-implemented method according to claim 13, further comprising:
for each of said plurality of objects of said class of objects:
receiving as input said second two-dimensional projection image and said acquisition data associated with said second two-dimensional projection image;
wherein said processing comprises combining said first and second two-dimensional projection images based upon said acquisition data associated with each of said first and second two-dimensional projection images.

15. A computer-implemented method according to claim 13,
wherein said received first two-dimensional projection image for each object of said plurality of objects is generated by:
receiving a three-dimensional image of said object; and
generating said first two-dimensional projecton image of said object based upon said received three-dimensional image and said acquisition data associated with said first two-dimensional projection image; and
wherein said received second two-dimensional projection image for each object of said plurality of objects is generated by:
generating said second two-dimensional projection image of said object based upon said received three-dimensional image and said acquisition data associated with said two-dimensional projection image.

16. A computer-implemented method according to claim 15, wherein generating said first and second two-dimensional projection images of said object comprises for each image:
determining a plurality of paths through said object based upon said acquisition data associated with said image, said plurality of paths representing a path from a source of electromagnetic radiation to an associated sensor of electromagnetic radiation; and
processing said image to generate, for each of said plurality of paths, a data value providing an indication of total attenuation of said electromagnetic radiation along said path.

17. A computer-implemented method according to claim 16,
wherein said three-dimensional image data comprises a plurality of voxels, each voxel of said three-dimensional data having a first value based upon at least one pixel of the first two-dimensional projection image and a second value based upon at least one pixel of the second two-dimensional image;
wherein said first values are also based upon a value of at least one pixel of said first two-dimensional image, each of the at least one pixel being determined based upon a path from said source of electromagnetic radiation to a pixel location of the sensor; and
wherein said second values are based upon a value of at least one pixel of said second two-dimensional image, each of the at least one pixel being determined based upon a path from said source of electromagnetic radiation to a pixel location of the sensor.

18. A computer-implemented method according to claim 15, wherein the received three-dimensional images of said object is a set of Computed Tomography images.

19. A computer-implemented method according to claim 13, further comprising:
processing the generated three-dimensional representation of an object to fit the model to the three-dimensional representation of the object; and
identifying features in the three-dimensional representation of said object based upon said fit of said model.

20. A computer readable medium carrying a computer program comprising computer readable instructions configured to cause a computer to generate a three-dimensional representation of an object by carrying out the steps of:
receiving as input to the processor a first two-dimensional projection image;
receiving as input to the processor acquisition data associated said first two-dimensional projection image; and
processing said first two-dimensional projection image based upon said acquisition data to generate a three-dimensional volume of data providing said representation of said object, the volume of data comprising a plurality of voxels, each voxel having a value based upon at least one pixel of the two-dimensional projection image.

21. A computer apparatus for generating a three-dimensional representation of an object comprising:
a memory storing processor readable instructions; and
a processor arranged to read and execute instructions stored in said memory;
wherein said processor readable instructions comprise instructions arranged to control the computer to carry out the steps of:
receiving as input a first two-dimensional projection image;
receiving as input acquisition data associated said first two-dimensional projection image; and
processing said first two-dimensional projection image based upon said acquisition data to generate a three-dimensional volume of data providing said representation of said object, the volume of data comprising a plurality of voxels, each voxel having a value based upon at least one pixel of the two-dimensional projection image.

* * * * *